United States Patent
Wu

(10) Patent No.: US 8,516,592 B1
(45) Date of Patent: Aug. 20, 2013

(54) WIRELESS HOTSPOT WITH LIGHTWEIGHT ANTI-MALWARE

(75) Inventor: Tzu-Chien Wu, Taipei (TW)

(73) Assignee: Trend Micro Incorporated, Tokyo (JP)

( * ) Notice: Subject to any disclaimer, the term of this patent is extended or adjusted under 35 U.S.C. 154(b) by 135 days.

(21) Appl. No.: 13/158,682

(22) Filed: Jun. 13, 2011

(51) Int. Cl.
*H04L 29/06* (2006.01)

(52) U.S. Cl.
USPC .................. 726/24; 726/23; 726/25; 726/12

(58) Field of Classification Search
USPC ........................................... 726/24
See application file for complete search history.

(56) References Cited

U.S. PATENT DOCUMENTS

| | | | |
|---|---|---|---|
| 5,442,699 A | 8/1995 | Arnold et al. | |
| 5,452,442 A | 9/1995 | Kephart | |
| 5,640,492 A | 6/1997 | Cortes et al. | |
| 5,907,834 A | 5/1999 | Kephart et al. | |
| 6,161,130 A | 12/2000 | Horvitz et al. | |
| 6,192,512 B1 | 2/2001 | Chess | |
| 6,279,128 B1 | 8/2001 | Arnold et al. | |
| 6,327,579 B1 | 12/2001 | Crawford | |
| 6,622,134 B1 | 9/2003 | Sorkin | |
| 6,650,890 B1 | 11/2003 | Irlam et al. | |
| 6,711,583 B2 | 3/2004 | Chess et al. | |
| 6,732,157 B1 | 5/2004 | Gordon et al. | |
| 6,778,941 B1 | 8/2004 | Worrell et al. | |
| 6,789,200 B1 | 9/2004 | Fiveash et al. | |
| 6,813,712 B1 | 11/2004 | Luke | |
| 7,076,527 B2 | 7/2006 | Bellegarda et al. | |
| 7,089,429 B2 | 8/2006 | Gustafsson | |
| 7,426,510 B1 | 9/2008 | Libenzi et al. | |
| 7,735,138 B2 | 6/2010 | Zhao | |
| 7,756,535 B1 | 7/2010 | Diao et al. | |
| 8,023,974 B1 | 9/2011 | Diao et al. | |
| 8,259,571 B1 * | 9/2012 | Raphel et al. .................. | 370/230 |
| 2002/0042886 A1 | 4/2002 | Lahti et al. | |
| 2002/0178375 A1 | 11/2002 | Whitaker et al. | |
| 2002/0178381 A1 | 11/2002 | Lee et al. | |
| 2003/0065941 A1 * | 4/2003 | Ballard et al. ................ | 713/201 |
| 2003/0079145 A1 | 4/2003 | Kouznetsov et al. | |
| 2003/0177397 A1 | 9/2003 | Samman | |
| 2003/0182431 A1 | 9/2003 | Sturniolo et al. | |
| 2004/0002932 A1 | 1/2004 | Horvitz et al. | |
| 2004/0054911 A1 | 3/2004 | Chennakeshu et al. | |
| 2004/0083384 A1 | 4/2004 | Hypponen | |
| 2004/0148330 A1 | 7/2004 | Alspector et al. | |

(Continued)

FOREIGN PATENT DOCUMENTS

| | | |
|---|---|---|
| EP | 1 316 873 A2 | 4/2003 |
| EP | 1 377 892 B1 | 9/2004 |
| WO | 02 084459 A1 | 10/2002 |
| WO | 03 017068 A2 | 2/2003 |

*Primary Examiner* — Jung Kim
*Assistant Examiner* — Ghodrat Jamshidi
(74) *Attorney, Agent, or Firm* — Okamoto & Benedicto LLP

(57) ABSTRACT

A mobile computing device, such as a mobile phone, serves as a wireless hotspot for other mobile computing devices. The other mobile computing devices connect to the mobile phone over a wireless computer network, and the mobile phone connects to the Internet over a mobile phone network. The wireless computer network may be a WiFi network and the mobile phone network may be a 3G network. The mobile phone may include a lightweight anti-malware client for screening network traffic between the other mobile computing devices and web servers on the Internet. The lightweight anti-malware client may consult a cloud security network for reputation of data included in the network traffic.

19 Claims, 3 Drawing Sheets

(56) References Cited

U.S. PATENT DOCUMENTS

| | | |
|---|---|---|
| 2004/0158741 A1 | 8/2004 | Scheider |
| 2004/0237079 A1 | 11/2004 | Cox et al. |
| 2005/0033975 A1 | 2/2005 | Lahti et al. |
| 2005/0192992 A1 | 9/2005 | Reed et al. |
| 2005/0229250 A1 | 10/2005 | Ring et al. |
| 2005/0286522 A1 | 12/2005 | Paddon et al. |
| 2006/0149821 A1 | 7/2006 | Rajan et al. |
| 2006/0259543 A1 | 11/2006 | Tindall |
| 2007/0022075 A1 | 1/2007 | Horvitz et al. |
| 2007/0233463 A1 | 10/2007 | Sparre |
| 2008/0153513 A1 | 6/2008 | Flake et al. |
| 2009/0207824 A1* | 8/2009 | Lee et al. ............... 370/338 |
| 2010/0293249 A1* | 11/2010 | Beaulieu et al. ............ 709/219 |

\* cited by examiner

WIRELESS HOTSPOT WITH LIGHTWEIGHT ANTI-MALWARE

BACKGROUND OF THE INVENTION

1. Field of the Invention

The present invention relates generally to computer security.

2. Description of the Background Art

Mobile computing devices, such as notebook computers (also referred to as "laptops") and tablet computers (e.g., Apple® iPad tablets), are employed on the go in various locations. While most mobile computing devices have short range wireless computer network connectivity, not all of them can perform data communication over a long range telecommunications network, such as a mobile phone network. As a particular example, notebook computers typically come with a WiFi adapter but very few have 3G capability. These notebook computers would thus have to connect to a WiFi hotspot in order to connect to the Internet. Once on the Internet, the notebook computers are exposed to all sorts of computer security threats, including malware (e.g., computer viruses, worms, spyware, Trojans, bots) and fraudulent schemes (e.g., phishing). A popular way of protecting computers against security threats is to employ an anti-malware. However, deployment of anti-malware is not trivial because an anti-malware is typically not free, has to be updated, and needs to be installed and running in the protected computer. To make matters worse, some mobile computing devices are not compatible with popular anti-malware or do not have the requisite computing power to run an anti-malware.

SUMMARY

In one embodiment, a computer-implemented method of providing a wireless hotspot comprises a mobile computing device connecting to a mobile phone by way of a wireless computer network, the mobile phone serving as a wireless hotspot for connecting to the Internet. The mobile phone receives network traffic from a web server on the Internet over a mobile phone network, the network traffic being for the mobile computing device. The mobile phone sends identifying characteristics of an incoming data from the network traffic to a cloud security network for evaluation. The mobile phone receives a result of the evaluation from the cloud security network. The mobile phone makes the forwarding of the incoming data to the mobile computing device over the wireless computer network contingent on the result of the evaluation.

In another embodiment, a system for providing a wireless hotspot comprises a web server, a plurality of mobile computing devices connected to the Internet by way of a wireless hotspot, and a mobile phone configured to serve as the wireless hotspot for the plurality of mobile computing devices, the mobile phone including a wireless computer network interface for connecting to a wireless computer network and a mobile phone network interface for connecting to a mobile phone network, the mobile phone being connected to the plurality of mobile computing devices over the wireless computer network and to the web server on the Internet over the mobile phone network, the mobile phone being configured to receive incoming data transmitted by the web server to a mobile computing device in the plurality of mobile computing devices and screen the incoming data for malicious content using a remotely located cloud security network.

In yet another embodiment, a computer-implemented method of providing a wireless hotspot comprises a first mobile computing device serving as a wireless hotspot for a second mobile computing device. The first mobile computing device receives network traffic between the second mobile computing device and a web server, the first mobile computing device communicating with the second mobile computing device over a wireless computer network, the first mobile computing device communicating with the web server over a mobile phone network. The first mobile computing device screens the network traffic for malicious content.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
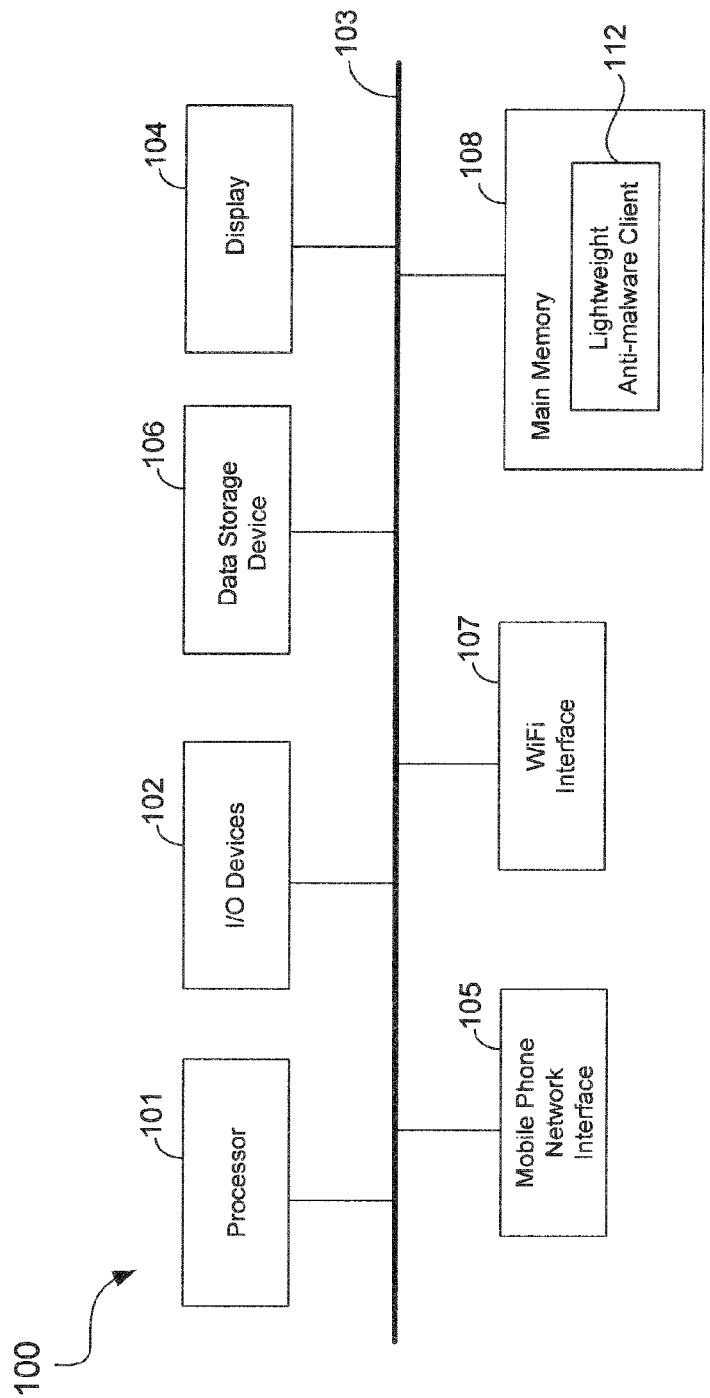
FIG. 1 shows a schematic diagram of a mobile computing device in accordance with an embodiment of the present invention.

Referring now to FIG. 1, there is shown a schematic diagram of a mobile computing device 100 in accordance with an embodiment of the present invention. The mobile computing device 100 may be a smart mobile phone, for example. In the example of FIG. 1, the mobile computing device 100 includes a processor 101, a bus 103 coupling its various components, I/O devices 102 (e.g., keyboard, touch screen, keypad, microphone, speaker), a data storage device 106 (e.g., flash memory), a display 104, a telecommunications network interface in the form of a mobile phone network interface 105, a wireless computer network interface in the form of a WiFi interface 107, and a main memory 108 (e.g., RAM). The mobile phone network interface 105 may be coupled to a 3G network or other telecommunications network that supports data and voice communications.

The mobile computing device 100 is a particular machine as programmed with computer-readable program code. The mobile computing device 100 includes computer-readable program code loaded non-transitory in the main memory 108 for execution by the processor 101. In the example of FIG. 1, the mobile computing device 100 includes a computer-readable program code (i.e., computer instructions or software) module in the form of a lightweight anti-malware client 112.

In one embodiment, the mobile computing device 100 comprises a mobile phone with wireless hotspot capability. A wireless hotspot provides Internet access to computing devices that can connect to a wireless local are network, such as a WiFi network. Examples of mobile phones with wireless hotspot capability include mobile phones running the Android operating system (version 2.1 and above) and jailbroken iPhone® mobile phones with the MyWi application. Other mobile computing devices may wirelessly connect to the mobile computing device 100 over a WiFi network, and then to the Internet using the 3G network connectivity of the mobile computing device 100.

The lightweight anti-malware client 112 may comprise computer-readable program code for examining network traffic for computer security threats. In one embodiment, the lightweight anti-malware client 112 is configured to screen network traffic to detect malicious e-mails, infected files, and communications from malicious websites. The anti-malware client 112 is lightweight in that it does not necessarily have to perform the task of analyzing data found in network traffic in the mobile computing device 100, and accordingly is relatively small in size compared to conventional anti-malware. In one embodiment, the lightweight anti-malware client 112 is configured to work in conjunction with remotely located security server computers of a cloud security network. The lightweight anti-malware client 112 may be configured to receive network traffic, extract relevant data from the network traffic, and send identifying characteristics of the relevant data to the cloud security network. The cloud security network evaluates the identifying characteristics of the relevant data, and returns the result of the evaluation to the lightweight anti-malware client 112.

Being relatively small and not too computing resource intensive, the lightweight anti-malware client 112 is particularly advantageous to a mobile phone that serves as a wireless hot spot for other mobile computing devices. Other mobile computing devices that connect to the Internet by way of the computing device 100 may take advantage of the protection provided by the lightweight anti-malware client 112, and therefore do not necessarily need their own anti-malware. This is a welcome feature not just in terms of cost effectiveness and ease of maintenance and deployment, but also because some mobile computing devices may not be powerful enough to run its own anti-malware or may not have anti-malware available for them.

Figure 2:
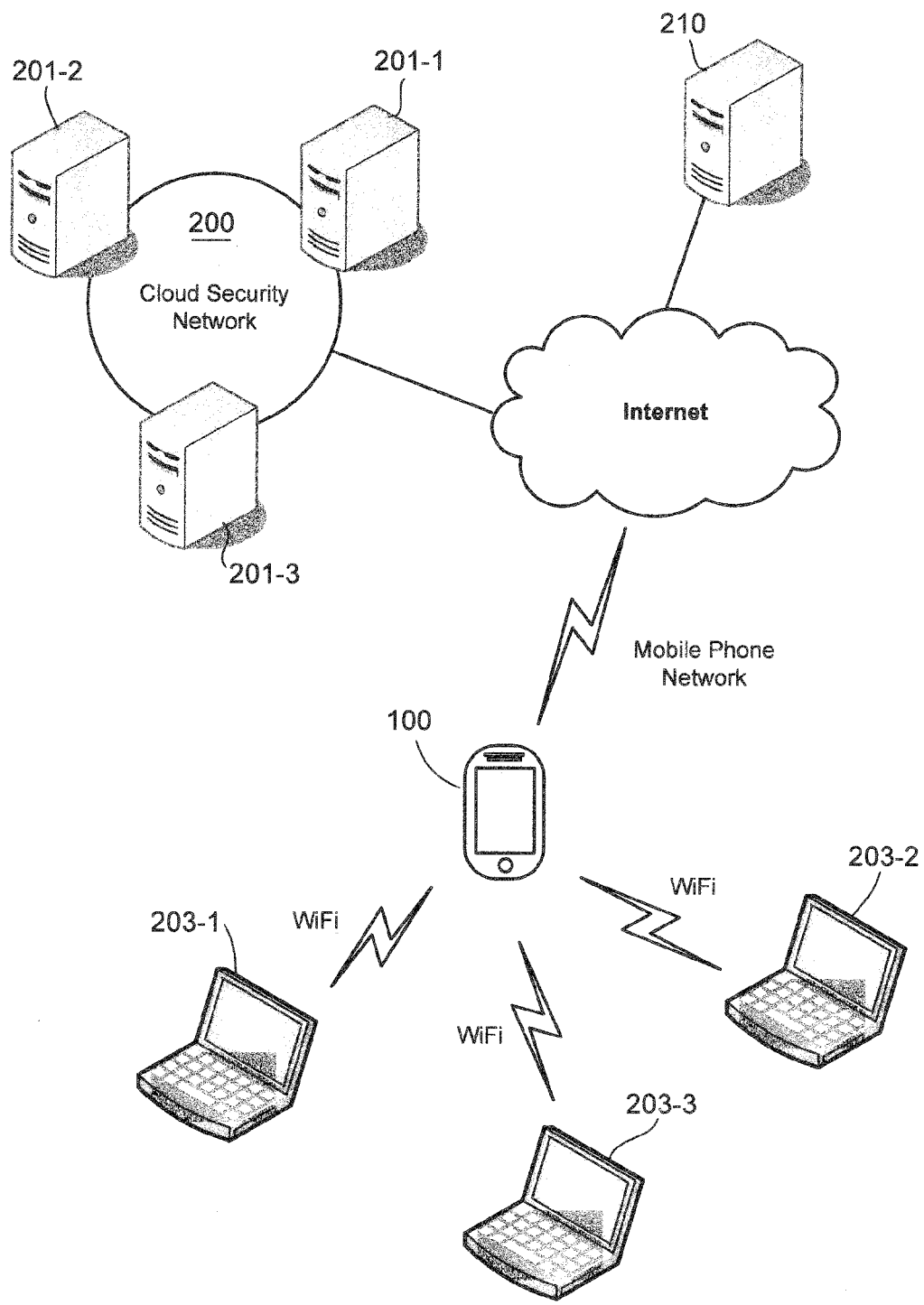
FIG. 2 shows a system for providing a wireless hotspot in accordance with an embodiment of the present invention.

FIG. 2 shows a system for providing a wireless hotspot in accordance with an embodiment of the present invention. In the example of FIG. 2, the system includes a plurality of mobile computing devices 203 (i.e., 203-1, 203-2, 203-3, etc.), the mobile computing device 100, one or more web servers 210, and a cloud security network 200. The cloud security network 200 may comprise a plurality of security servers 201 (i.e., 201-1, 201-2, 201-3, etc.).

The mobile computing devices 203 may comprise notebook computers, tablet computers, and other mobile computing devices with wireless computer network connectivity. In the example of FIG. 2, the mobile computing devices 203 are WiFi enabled but do not have connectivity to a telecommunications network. As can be appreciated, a WiFi network is a form of local area network and provides short range connectivity. Because the mobile computing devices 203 cannot connect to a telecommunications network, such as a 3G network, the mobile computing devices 203 need a wireless hotspot to connect to the Internet. In the example of FIG. 2, the mobile computing devices 203 connect to the Internet over a WiFi connection to the mobile computing device 100, and from the mobile computing device 100 to the Internet using the 3G connection of the mobile computing device 100.

In the example of FIG. 2, the mobile computing device 100 is a mobile phone that serves as a wireless hotspot for the mobile computing devices 203. The mobile computing device 100 may provide a wireless hotspot service using its WiFi interface 107 and appropriate software. The mobile computing devices 203 may wirelessly connect to the mobile computing device 100 over a WiFi network. Using its mobile phone network interface 105 and appropriate software, the mobile computing device 100 connects to the Internet over a cellular mobile phone network, which in one embodiment comprises a 3G network.

The cloud security network 200 may comprise a network of security servers 201. The cloud security network 200 may receive identifying characteristics of incoming or outgoing data from the lightweight anti-malware client 112 and determine a reputation of the incoming or outgoing data by consulting a reputation database in one of the security servers 201. A security server 201 may comprise a server computer configured to provide a computer security service. In one embodiment, the cloud security network 200 provides web, e-mail, and file reputation services. The cloud security network 200 may provide fewer or additional computer security services. The cloud security network 200 may comprise the Smart Protection Network™ infrastructure of Trend Micro Inc., for example. Other suitable cloud security networks may also be employed.

As a particular example, anti-malware researchers may analyze websites and web pages to determine their reputation, e.g., whether the websites and web pages are malicious, safe, or unknown. The security server 201-1 may provide web reputation service by maintaining a web reputation database containing the reputation of these websites and web pages. The websites and web pages may be referenced by their identifying characteristics, such as URL (uniform resource locator). As another example, the anti-malware researchers may analyze e-mails collected over the Internet (e.g., collected in honeypot computers). The reputation of these e-mails, e.g., whether the e-mails are malicious, safe, or unknown, may be stored in an e-mail reputation database maintained by the security server 202-2. The e-mails may be referenced by their identifying characteristics, such as the IP (internet protocol) address of the sender and/or destination computers, e-mail structure, calculated hash of the e-mail content, etc. Yet another example, the anti-malware researchers may analyze files collected over the Internet and store the reputation of the files, e.g., whether the files are malicious, safe, or unknown, in a file reputation database maintained by the security server 202-3. The files may be reference by their hash value or other identifying characteristics.

A web server 210 may comprise a server computer coupled to the Internet. A web server 210 may host a website for serving web pages, an e-mail server, or a file server, for example. As can be appreciated, there are a lot of web servers coupled to the Internet. Only one is shown in FIG. 2 for clarity of illustration.

Figure 3:
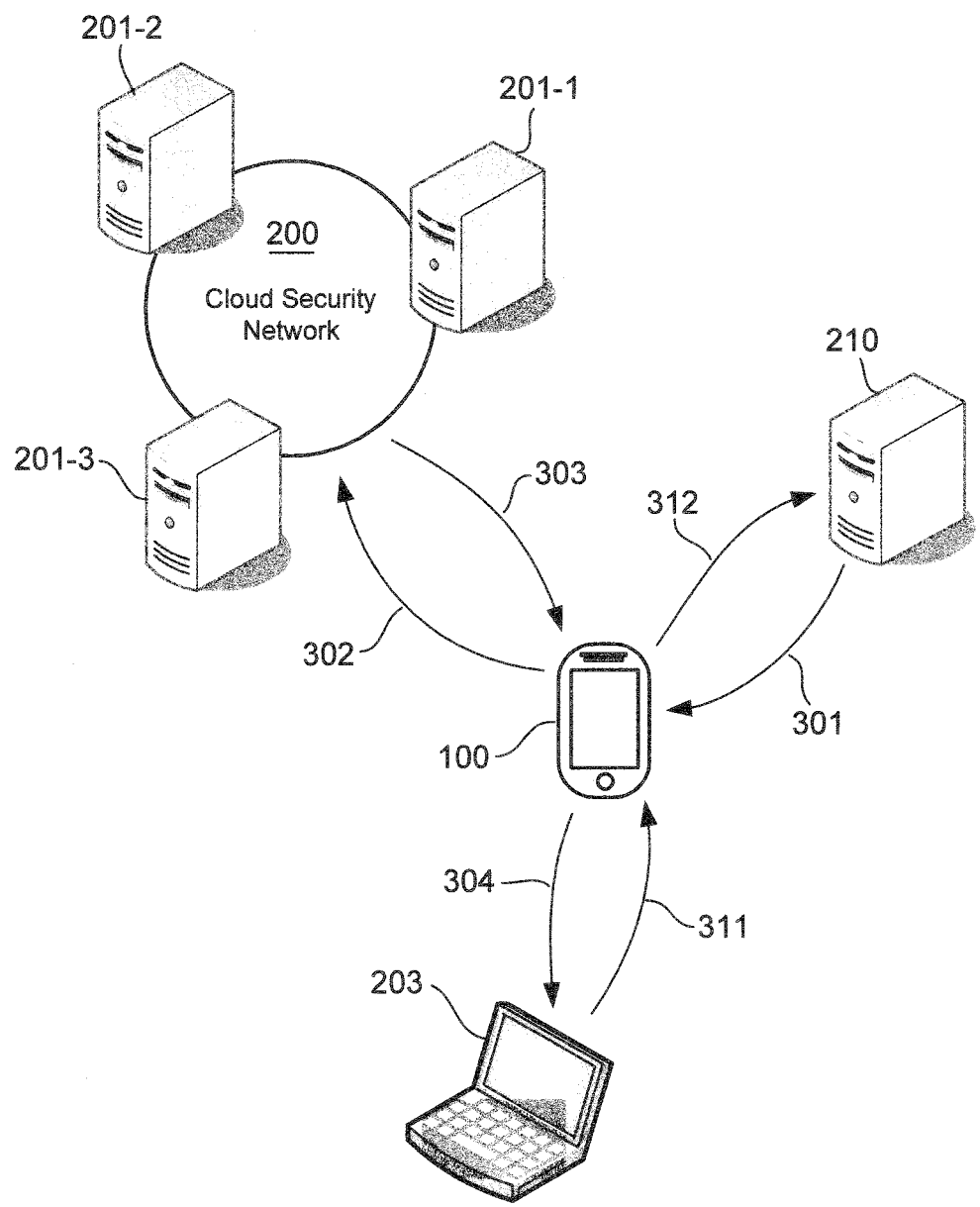
FIG. 3 schematically illustrates a computer-implemented method of providing a wireless hotspot in accordance with an embodiment of the present invention.

FIG. 3 schematically illustrates a computer-implemented method of providing a wireless hotspot in accordance with an embodiment of the present invention. The method of FIG. 3 is explained using the system of FIG. 2 for illustration purposes only. Other systems or components may also be employed without detracting from the merits of the present invention.

In the example of FIG. 3, the mobile computing device 100 is a mobile phone that serves as a wireless hotspot. The mobile computing device 100 uses its mobile phone network interface 105 to connect to a cellular mobile phone network, which is a 3G network in this example. Internet Service Provider (ISP) gateways, routers, etc. for connecting to the Internet are not shown for clarity of illustration. A mobile computing device 203 has no interface to connect to a telecommunications network and accordingly uses its WiFi interface to connect to the Internet by way of the mobile computing device 100. The mobile computing device 100 includes the lightweight anti-malware client 112, allowing the mobile computing device 203 to safely connect to the Internet even when the mobile computing device 203 itself does not have an anti-malware installed.

The mobile computing device 203 communicates with the web server 210 over the Internet using the mobile computing device 100 as a wireless hotspot. This allows network traffic between the mobile computing device 203 and the web server 210 to pass through and be screened by the mobile computing device 100. For example, the web server 210 may send incoming data to the mobile computing device 203. The mobile computing device 100 receives the incoming data over the mobile phone network and screens the incoming data. More specifically, the lightweight anti-malware client 112 running in the mobile computing device 100 receives network traffic from the web server 210 (arrow 301), and extracts the incoming data from the network traffic.

In one embodiment, the lightweight anti-malware client 112 sends identifying characteristics of the incoming data (instead of the entire incoming data) to the cloud security network 200 for evaluation (arrow 302). The identifying characteristics of the incoming data sent by the lightweight anti-malware client 112 to the cloud security network 200 may vary depending on the type of the incoming data. When the incoming data is a web page, the lightweight anti-malware client 112 may send the web address of the web page to the cloud security network 200. When the incoming data is an e-mail or a file, the lightweight anti-malware client 112 may send calculated content or hash value, structure, source, keywords, and other characteristics identifying the e-mail or file to the cloud security network 200. Sending identifying characteristics of the incoming data rather than the entirety of the incoming data advantageously conserves network bandwidth, cuts down on network usage fees, and protects user privacy.

The lightweight anti-malware client 112 may send identifying characteristics of the incoming data to a corresponding security server 201 depending on the type of the incoming data. For example, the lightweight anti-malware client 112 may send identifying characteristics of the incoming data to the security server 201-1 when the incoming data is a web page from a website, to the security server 201-2 when the incoming data is an e-mail, and to the security server 201-3 when the incoming data is a file. A security server 201 may evaluate the identifying characteristics of the incoming data by consulting its reputation database, for example.

The lightweight anti-malware client 112 receives the result of the evaluation of the identifying characteristics of the incoming data from the cloud security network 200 (arrow 303). More specifically, the lightweight anti-malware client 112 may receive the result of the evaluation from the corresponding security server 201. The result of the evaluation may indicate whether the incoming data is malicious, safe, or unknown. The lightweight anti-malware client 112 may perform a responsive action upon detection of malicious data. For example, the lightweight anti-malware client 112 may block the incoming data from being received by the mobile computing device 203 when the incoming data is malicious, such as when the incoming data comprises a computer virus, a spam e-mail, or a web page from a malicious website. This prevents Internet threats from getting into the shared WiFi network. Otherwise, when the incoming data is not malicious, the lightweight anti-malware client 112 allows the network traffic to pass to forward the incoming data to the mobile computing device 203 over the WiFi network (arrow 304). The mobile computing device 100 thus makes the forwarding of the incoming data to the mobile computing device 203 contingent on the result of the evaluation performed by the cloud security network 200.

The just described method of providing a wireless hotspot may also be performed on outgoing data originated by the mobile computing device 203 for reception by the web server 210. For example, the mobile computing device 203 may send outgoing data to the web server 210. The mobile computing device 100 receives the outgoing data over the WiFi network and screens the outgoing data. More specifically, the lightweight anti-malware client 112 running in the mobile computing device 100 receives network traffic from the mobile computing device 203 (arrow 311), and extracts the outgoing data from the network traffic.

The lightweight anti-malware client 112 sends identifying characteristics of the outgoing data to the cloud security network 200 for evaluation (arrow 302) and receives the result of the evaluation from the cloud security network 200 as before (arrow 303). The result of the evaluation may indicate whether the outgoing data is malicious, safe, or unknown. The lightweight anti-malware client 112 may perform a responsive action upon detection of malicious data. For example, the lightweight anti-malware client 112 may block the outgoing data when the outgoing data is malicious, such as when the outgoing data is addressed to a web server having a reputation of being malicious as indicated in the web reputation database in the security server 201-1. Otherwise, when the outgoing data is not malicious, the lightweight anti-malware client 112 may forward the outgoing data to the web server 210 over the mobile phone network (arrow 312).

Methods and systems for providing a wireless hotspot have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A computer-implemented method of providing a wireless hotspot, the method comprising:
   a mobile computing device connecting to a mobile phone by way of a wireless computer network, the mobile phone serving as a wireless hotspot for connecting to the Internet;
   the mobile phone receiving network traffic from a web server on the Internet over a mobile phone network, the network traffic being for the mobile computing device;
   the mobile phone sending identifying characteristics of an incoming data from the network traffic to a cloud security network for evaluation;
   the mobile phone receiving a result of the evaluation from the cloud security network; and
   the mobile phone making the forwarding of the incoming data to the mobile computing device over the wireless computer network contingent on the result of the evaluation.

2. The method of claim 1 wherein the wireless computer network comprises a WiFi network.

3. The method of claim 2 wherein the mobile phone network comprises a 3G network.

4. The method of claim 1 further comprising:
   the mobile phone detecting that the incoming data is malicious based on the result of the evaluation.

5. The method of claim 4 wherein the incoming data comprises a computer virus.

6. The method of claim 5 wherein the incoming data comprises a file.

7. The method of claim 1 further comprising:
   the mobile phone detecting that the incoming data is not malicious based on the result of the evaluation; and
   in response to detecting that the incoming data is not malicious, letting the incoming data first set of network traffic to pass to the mobile computing device.

8. The method of claim 7 wherein the mobile computing device comprises a tablet computer that has no installed anti-malware.

9. A system for providing a wireless hotspot, the system comprising:
   a web server;
   a plurality of mobile computing devices connected to the Internet by way of a wireless hotspot; and
   a mobile phone configured to serve as the wireless hotspot for the plurality of mobile computing devices, the mobile phone including a wireless computer network interface for connecting to a wireless computer network and a mobile phone network interface for connecting to a mobile phone network, the mobile phone being connected to the plurality of mobile computing devices over the wireless computer network and to the web server on the Internet over the mobile phone network, the mobile phone including a lightweight anti-malware client configured to receive incoming data transmitted by the web server to a mobile computing device in the plurality of mobile computing devices and to screen the incoming data for malicious content using a remotely located cloud security network, the mobile phone forwarding the incoming data to the mobile computing device depending on a result of evaluation of the incoming data by the remotely located cloud security network.

10. The system of claim 9 wherein the wireless computer network comprises a WiFi network.

11. The system of claim 10 wherein the mobile phone network comprises a 3G network.

12. The system of claim 9 wherein the lightweight anti-malware client of the mobile phone is configured to consult a server computer in the cloud security network for reputation of the incoming data.

13. The system of claim 9 wherein the mobile computing device comprises a tablet computer that has no installed anti-malware.

14. A computer-implemented method of providing a wireless hotspot, the method comprising:
   a first mobile computing device serving as a wireless hotspot for a second mobile computing device;
   the first mobile computing device receiving network traffic between the second mobile computing device and a web server, the first mobile computing device communicating with the second mobile computing device over a wireless computer network, the first mobile computing device communicating with the web server over a mobile phone network; and
   the first mobile computing device screening the network traffic for malicious content, the first mobile computing device sending identifying characteristics of the network traffic to a cloud security network for evaluation, and blocking the network traffic to prevent the network traffic from being forwarded out of the first mobile computing device depending on a result of the evaluation of the cloud security network of the identifying characteristics of the network traffic.

15. The computer-implemented method of claim 14 wherein the first mobile computing device comprises a mobile phone.

16. The method of claim 14 wherein the wireless computer network comprises a WiFi network.

17. The method of claim 16 wherein the mobile phone network comprises a 3G network.

18. The method of claim 14 wherein the cloud security network maintains a reputation database, consults the reputation database for reputation of data included in the network traffic, and provides the reputation of the data to the first mobile computing device; and
   the mobile phone detecting that the data is malicious based on the reputation of the data received from the cloud security network.

19. The method of claim 14 wherein the second mobile computing device comprises a tablet computer that has no installed anti-malware.

\* \* \* \* \*